Patented Aug. 4, 1953

2,647,820

UNITED STATES PATENT OFFICE 2,647,820

PROCESS FOR RECOVERING NICKEL AND/
OR COBALT AMMONIUM SULFATE FROM
SOLUTIONS CONTAINING NICKEL AND/OR
COBALT VALUES

Frank Arthur Forward, Vancouver, British Columbia, Canada, assignor to Sherritt Gordon Mines Limited, Toronto, Ontario, Canada, a corporation of Ontario, Canada No Drawing. Application July 16, 1951, Serial No. 237,066. In Canada November 6, 1948

12 Claims. (Cl. 23—119)

This invention relates to a process for precipitating and separately recovering nickel and/or cobalt ammonium sulphate from solutions containing nickel and/or cobalt values. This application is a continuation-in-part of my application No. 58,644 filed November 6, 1948, now U. S. Patent No. 2,576,314, issued November 27, 1951.

Processes involving the leaching of nickeliferous oxide ores and concentrates with an ammonia-ammonium carbonate solution for the extraction of the nickel values and the subsequent treatments of the resulting leach solutions are relatively well known in the metallurgical art.

The ammonia-ammonium carbonate leaching processes of the prior art have the disadvantage that the nickel and other metals to be extracted from the starting ore or concentrate must be in reduced metallic form preparatory to the leaching step, and sulphide material must be subjected to preliminary oxidizing and reducing roasting operations to prepare it for leaching with an ammonia-ammonium carbonate leach solution. A further disadvantage is that the nickel content of the leach solution is very low, necessitating the use and the subsequent treatment of large volumes of ammonia-ammonium carbonate leach solution.

It has been found that the nickel values of nickeliferous sulphide material, such as nickeliferous sulphide ores, concentrates, matte, speiss and the like can be successfully and economically extracted on a commercial scale with a high degree of efficiency and without any preliminary pyrometallurgical operations by leaching the sulphide material directly with a strong aqueous ammonia solution substantially free from ammonium carbonate in the presence of an oxidizing gas such as air, compressed air, oxygen enriched air, or oxygen alone or in combination with one or more other inert gases, the leaching being conducted, preferably, at elevated temperature and under superatmospheric pressure. Under these conditions, the nickel, copper, cobalt and associated metal values of the starting material are rapidly and efficiently put into solution from which they can be separately extracted in a highly purified condition.

A problem in the operation of this type of leaching process is encountered when metal values other than nickel and cobalt values are present in the starting material and which are soluble in the ammoniacal solution under the prevailing leaching conditions, such as copper values. These metal values enter the leach solution with the nickel and/or cobalt and it is difficult to recover the nickel and/or cobalt values separately from the solution uncontaminated with these other metals.

An important object of the present invention is to provide an easily executed, highly effective process for precipitating and separately recovering nickel and/or cobalt ammonium sulphate substantially free from other metal compounds from ammoniacal solutions containing nickel and/or cobalt values.

A further important object of the invention is to provide a process in which the nickel values contained in an ammoniacal solution can be recovered from the solution separately from any copper and/or cobalt values with which it was associated in the solution and the copper and/or cobalt values can be recovered separately from the solution in an ideal condition for the recovery of the metal values.

These objects of the invention may be attained, in general, by adjusting the pH value of the solution to about pH 7, such as by heating the solution to drive off the excess ammonia, which may be recovered for re-use, if desired, and thereafter reducing the pH value of the solution by the addition of sulphuric acid to within the range of from about pH 7 to about pH 3, within which range the nickel and/or cobalt values precipitate, as complex nickel and/or cobalt ammonium sulphate, in ideal condition for the separate recovery of the metal values.

The process is readily adaptable to provide for the precipitation of nickel ammonium sulphate substantially free from cobalt ammonium sulphate from solutions containing both nickel and cobalt values; or the precipitation of a complex nickel-cobalt ammonium sulphate; or the separate precipitation of nickel or nickel-cobalt ammonium sulphate from solutions containing varying amounts of other metal compounds in solution.

The ammoniacal leach solution containing the nickel values and other metal values, such as copper and cobalt, may be derived from any one of several known leaching processes, for example, that process disclosed in my copending application No. 58,644, filed November 6, 1948, now U. S. Patent No. 2,576,314, issued November 27, 1951, in which nickeliferous sulphide material is leached with strong aqueous ammonia substantially free from ammonium carbonate.

The leach solution derived from the leaching operation usually is relatively strongly ammoniacal and may contain, in addition to the nickel and/or cobalt values, other metal values, such as copper, which were associated with the nickel and/or cobalt values in the starting material and which are soluble in the ammonia leach solution under the prevailing temperature and pressure conditions. This solution can be treated directly by the process of the present invention or it can be given a preliminary treatment to precipitate and separate the ammonia soluble metal compounds whose sulphides are of lower solubility than nickel and/or cobalt sulphide, such as copper sulphide, associated with the nickel and/or cobalt in the starting material. For example, the leaching step can be conducted or the resulting leach solution treated, as disclosed in co-pending application No. 206,612 filed January 18, 1951, to produce a leach solution containing, in addition to the metal values, thiosulphate and polythionate ions in addition to dithionate and sulphate ions. The leach solution is heated to and maintained at a temperature at or approaching its boiling temperature for a predetermined period of time and the metal compounds the sulphides of which are of lower solubility than nickel sulphide, precipitate substantially completely. These precipitated metal compounds are separated from the solution by filtration leaving the nickel and/or cobalt in the solution substantially free from other ammonia soluble metal values originally present in the starting solution. The ammonia released during the boiling treatment can be recovered, of course, for re-use.

Alternatively, if only small amounts of the compounds of the metals associated with the nickel and/or cobalt in the starting material are present in the leach solution it may be economically practical to treat the leach solution directly by the process of the present invention without any preliminary treatment.

I have found that the precipitation of the double salt nickel ammonium sulphate commences at about pH 7.0 but the reaction is slow and incomplete. For example, a solution containing nickel ammines can be boiled to remove "free" ammonia until the amount of ammonia left in the solution is approximately equivalent to that required to form nickel diammine,

$Ni(NH_3)_2^{++}$ at about pH 8.0. Continued boiling causes slow decomposition of the diammine, reduction of the pH to about 7.0, and precipitation of a small amount of nickel ammonium sulphate. The boiling step is terminated when the pH value of the solution has been reduced to about pH 7.1 to minimize the decomposition of nickel ammonium sulphate. As the boiling stage proceeds, the concentration of ammonia in the exit gas becomes progressively less and the moisture content becomes greater. This step can be controlled conveniently, therefore, by the ammonia content of the exit gas. After the boiling step, the solution is cooled to a temperature of at least about 135° F., and preferably to about 100° F., or lower, and sulphuric acid of the order of 20 normal (1:1) is added to reduce the pH value further. It usually is necessary to continue the cooling of the solution during the sulphuric acid addition to maintain the temperature of the solution below about 135° F. to prevent or at least minimize the decomposition of polythionates and avoid the precipitation of metal sulphides and elemental sulphur. The bulk of the nickel ammonium sulphate precipitates between about pH 6.8 and pH 6.2 and is substantially complete at about pH 6.0. However, in order to ensure the complete precipitation of both the nickel and cobalt ammonium sulphates, the addition of the acid should be continued until the pH value of the solution has been reduced to about pH 4 and, preferably to about pH 3.

The concentration of ammonium sulphate, $(NH_4)_2SO_4$, in the nickel leach solution is important. For example, at 25° C. nickel ammonium sulphate is very soluble in a 5% ammonium sulphate solution. However, this solubility decreases rapidly with increasing ammonium sulphate concentration until at a concentration of from 20% to 25% ammonium sulphate the solubility of nickel ammonium sulphate is reduced to about 0.1 gram of nickel per litre of solution. Thus, the ammonium sulphate concentration of the solution is maintained such as to minimize the solubility of nickel ammonium sulphate, within economically practical operating limits, of course.

The ammonium sulphate concentration of the solution recovered from the boiling stage may be such as to reduce the solubility of the nickel and/or cobalt ammonium sulphate to within the desired limits. If the ammonium sulphate concentration of the solution is low and the solubility of the nickel ammonium sulphate is correspondingly high, the ammonium sulphate concentration can be increased by the addition of ammonium sulphate, or ammonium sulphate may be produced within the solution by neutralizing part or all of the free ammonia and ammine ammonia with sulphuric acid and either restrict or omit the boiling step accordingly.

The purity of the precipitated nickel ammonium sulphate is affected by metallic ions which form similar salts, for example, copper and cobalt, and by unsaturated sulphur compounds which decompose to form colloidal sulphur in acid solution.

At concentrations of about 20% ammonium sulphate, the solubility of copper ammonium sulphate is equivalent to about 5 grams of copper per litre. This solubility decreases slightly with increasing ammonium sulphate concentration. Thus, if the concentration of copper in the ammoniacal nickeliferous solution is of the order of about 5 grams per litre or lower, it is possible to precipitate nickel ammonium sulphate almost quantitatively uncontaminated by copper.

If the concentration of copper is of the order of from about 5 to about 10 grams per litre, a small amount of copper ammonium sulphate will begin to precipitate at about pH 6.0 as the nickel precipitation is nearing completion. By controlling the pH value of the solution throughout the acid addition, it is possible to precipitate from 85% to 90% of the nickel ammonium sulphate without co-precipitation of copper ammonium sulphate. However, the last 10% of the nickel ammonium sulphate usually will contain copper and further copper ammonium sulphate precipitated at a pH value below about 6.0 will contain nickel.

If a small amount of copper ammonium sulphate is precipitated with the nickel ammonium sulphate, it is possible to remove the most of it by washing the nickel ammonium sulphate precipitate with a nearly saturated solution of ammonium sulphate. For example, it is possible to reduce the copper content of a nickel ammonium sulphate precipitate containing about 0.2% copper to less than 0.01% copper by three washes with nearly saturated ammonium sulphate solution.

The behaviour of cobalt in the acid addition depends upon its degree of oxidation. Cobalt in the reduced cobaltous state forms the salt cobaltous ammonium sulphate which has a solubility in about 25% ammonium sulphate solution intermediate between copper and nickel, equivalent to about 0.5 gram of cobalt per litre. However, even though all the cobalt present in the ammoniacal solution is in the reduced cobaltous form, it appears to co-precipitate readily with the bulky nickel ammonium sulphate leaving only traces of cobalt in the solution.

If the cobalt containing nickeliferous solution is oxidized while it is still in ammoniacal condition and prior to the acid addition, the cobalt is converted to cobaltic trivalent form which, when acidified, either does not form an ammonium sulphate salt or forms one which is very soluble in 20% to 25% ammonium sulphate solutions at about pH 5.0. It is difficult to determine whether or not cobaltic ammonium sulphate is actually present since, on oxidation in ammoniacal solution, cobalt forms a series of stable ammines which may not decompose even in acid solution. Whatever may be the explanation, it has been found that cobalt when present in a cobaltic trivalent form is soluble in the solution and does not co-precipitate with nickel ammonium sulphate and thus nickel ammonium sulphate substantially free from cobalt can be produced from ammoniacal solutions containing originally both nickel and cobalt values. The cobalt values of the solution can be converted to a cobaltic trivalent state by injecting an oxygen bearing, oxidizing gas such as air, oxygen enriched air, or oxygen alone into the solution either prior to the neutralizing or acid addition stages. The bulk of the nickel values of the solution can then be precipitated as nickel ammonium sulphate substantially free from cobalt. The solution resulting from this latter procedure contains a small amount of nickel and substantially all the cobalt values of the original solution from which the nickel and cobalt values can be separately recovered.

As a specific example of the operation of the process, the excess or "free" ammonia and ammine ammonia of an ammoniacal leach solution containing from about 40 to 50 grams of nickel per litre, less than 5 grams of copper per litre and a small amount of cobalt, was reduced to about pH 7.8 by flash boiling, the released ammonia being recovered for re-use in the leaching stage. The solution was then cooled to a temperature below about 135° F. and sulphuric acid, about 20 normal, was added to reduce the pH value to about pH 4.0, the temperature being maintained below about 135° F. during the acid addition. The major portion of the nickel values precipitated as nickel ammonium sulphate as the pH value of the solution was reduced from pH 6.8 to about pH 6.0. The nickel ammonium sulphate precipitated within the range of from about pH 6.8 to about pH 6.2 was substantially free from cobalt. The final traces of the nickel and the major portion of the cobalt values precipitated as the pH value of the solution was reduced from pH 6.0 to about pH 4.0. By controlling the temperature of the acid addition step and by quickly separating the nickel-cobalt ammonium sulphate, it was possible to reduce the co-precipitation of elemental sulphur to only a trace.

As a further modification of the operation of the invention, an oxidizing gas such as oxygen, oxygen enriched air, or air under pressure was injected into the solution prior to the boiling step for a period of time sufficient to oxidize the cobalt from the cobaltous state to a stable cobalt ammine which does not decompose in an acid solution, such as a trivalent cobaltic ammine. This oxidation step normally follows the boiling step but is conducted prior to the sulphuric acid addition. The bulk of the nickel values were precipitated as nickel ammonium sulphate during the acid addition as the pH was reduced from about pH 7 to about pH 6.2. The precipitated nickel ammonium sulphate was quickly separated from the solution, such as by filtration. This nickel ammonium sulphate was substantially free from cobalt. The acidified solution containing the cobalt values and a small amount of nickel was in ideal condition for the separation and recovery of the cobalt values substantially free from nickel.

Any copper values which precipitate with the nickel ammonium sulphate as copper ammonium sulphate can be separated from the precipitate by washing the precipitate with a nearly saturated solution of ammonium sulphate.

As a further modification of the operation of the process, an ammoniacal leach solution containing, in solution, nickel, cobalt and copper values, polythionates in addition to dithionate, thiosulphate and sulphate was boiled for a period of time sufficient to precipitate substantially all the copper values as copper sulphide. The precipitate was separated from the solution by filtration and the solution was then treated with sulphuric acid to precipitate the nickel and cobalt values as nickel and cobalt ammonium sulphate. In this latter modification, the solution derived from the boiling stage can be treated with an oxidizing gas to convert the cobalt to a cobaltic state and thus retain it in solution during the acid addition step and thus precipitate the nickel values as nickel ammonium sulphate substantially free from cobalt.

It will be understood, of course, that other modifications can be made in the preferred embodiments of the operation of the process described hereinabove without departing from the scope of the invention defined by the appended claims.

What I claim as new and desire to protect by Letters Patent of the United States is:

1. The method of treating an ammoniacal solution containing metal values selected from the group consisting of nickel and cobalt values which comprises the steps of adjusting the pH value of the solution to within the range of from about pH 8 to about pH 7.1, adding sulphuric acid to the solution to reduce the pH value of the solution to at least about pH 4 to convert said metal values to and precipitate them from said solution as metal ammonium sulphates, and separating precipitated metal ammonium sulphates from said solution.

2. The method of treating an ammoniacal solution containing metal values selected from the group consisting of nickel and cobalt values which comprises the steps of adjusting the pH value of the solution to within the range of from about pH 8 to about pH 7.1, adding sulphuric acid to the solution to reduce the pH value of the solution to at least about pH 4 whereby said metal values are converted to and precipitated from the said solution as metal ammonium sulphates, and maintaining the temperature of the solution below about 135° F. during the addition of sulphuric acid.

3. The method of treating an ammoniacal solution containing, in solution, nickel and cobalt values which comprises the steps of adjusting the pH value of the solution to within the range of from about pH 8 to about pH 7.1, adding sulphuric acid to the solution to reduce the pH value to at least about pH 6.2, whereby the major portion of the nickel values of the solution are converted to and precipitated as nickel ammonium sulphate substantially free from cobalt values, separating the nickel ammonium sulphate from the solution, adding sulphuric acid to the solution to reduce the pH value to at least about pH 4 to convert the cobalt values and the remainder of the nickel values to and precipitate them as nickel and cobalt ammonium sulphate, and separating the nickel and cobalt ammonium sulphate from the solution.

4. The method of treating an ammoniacal solution containing, in solution, nickel and cobalt values which comprises the steps of adjusting the pH value of the solution to within the range of from about pH 8 to about pH 7.1, adding sulphuric acid to the solution to reduce the pH value to at least about pH 6.2, whereby the major portion of the nickel values are converted to and precipitated as nickel ammonium sulphate, separating the nickel ammonium sulphate from the solution, adding sulphuric acid to the solution to reduce the pH value to at least about pH 4 to convert the cobalt values and the remainder of the nickel values to and precipitate them as nickel and cobalt ammonium sulphate, separating the nickel and cobalt ammonium sulphate from the solution, and maintaining the temperature of the solution during the sulphuric acid addition stages below about 135° F.

5. The method of treating an ammoniacal solution containing, in solution, nickel and cobalt values which comprises the steps of adjusting the pH value of the solution to within the range of from about pH 8 to about pH 7.1, feeding an oxygen bearing, oxidizing gas into the solution for a period of time sufficient to convert the cobalt values to the cobaltic state, adding sulphuric acid to the solution to reduce the pH value to at least about pH 6.2, whereby the major portion of the nickel values are converted to and precipitated as nickel ammonium sulphate, separating the nickel ammonium sulphate from the solution, adding sulphuric acid to the solution to reduce the pH value to at least about pH 4 to convert the cobalt values and the remainder of the nickel values to and precipitate them as nickel and cobalt ammonium sulphate, separating the nickel and cobalt ammonium sulphate from the solution, and maintaining the temperature of the solution during the sulphuric acid addition stages below about 135° F.

6. The method of treating an ammoniacal solution containing free ammonia and metal values selected from the group consisting of nickel and cobalt values which comprises reducing the pH value of the solution to within the range of from about pH 8 to about pH 7.1, and thereafter adding sulphuric acid to the solution to reduce the pH value of the solution to at least about pH 4 to convert said metal values to and precipitate them from said solution as metal ammonium sulphates, and separating precipitated metal ammonium sulphates from said solution.

7. The method of treating an ammoniacal solution containing free ammonia and metal values selected from the group consisting of nickel and cobalt values which comprises boiling the solution until the pH value has been reduced to within the range of from about pH 8 to about pH 7.1, recovering the ammonia released from the solution during the boiling step, cooling the solution to a temperature below about 135° F., adding sulphuric acid to the solution to reduce the pH value of the solution to at least about pH 4 whereby said metal values are converted to and precipitated from the said solution as metal ammonium sulphates, and maintaining the temperature of the solution below about 135° F. during the addition of sulphuric acid.

8. The method of treating an ammoniacal solution containing nickel values which comprises the steps of adjusting the pH value of the solution to within the range of from about pH 8 to about pH 7.1, adding sulphuric acid to the solution to reduce the pH value to at least about pH 6.2 to convert the major portion of the nickel values to and precipitate them from the solution as nickel ammonium sulphate, and separating the nickel ammonium sulphate from the solution.

9. The method of treating an ammoniacal solution containing free ammonia and nickel values which comprises the steps of boiling the solution until the pH value of the solution has been reduced to within the range of from about pH 8 to about pH 7.1, cooling the solution to a temperature below about 135° F., adding sulphuric acid to the solution to reduce the pH value to at least about pH 6.2, whereby the major portion of the nickel values are converted to and precipitate as nickel ammonium sulphate, maintaining the temperature of the solution during the sulphuric acid addition step below about 135° F., and thereafter separating the nickel ammonium sulphate from the solution.

10. The method of treating an ammoniacal solution containing cobalt values which comprises the steps of adjusting the pH value of the solution to within the range of from about pH 8 to about pH 7.1, adding sulphuric acid to the solution to reduce the pH value to at least about pH 4, whereby at least the major portion of the cobalt values are converted to and precipitate as cobalt ammonium sulphate, and separating the cobalt ammonium sulphate from the solution.

11. The method of treating an ammoniacal solution containing free ammonia and cobalt values which comprises the steps of boiling the solution until the pH value of the solution has been reduced to within the range of from about pH 8 to about pH 7.1, cooling the solution to a temperature below 135° F., adding sulphuric acid to the solution to reduce the pH value to at least about pH 4, whereby at least the major portion of the cobalt values are converted to and precipitate as cobalt ammonium sulphate, maintaining the temperature of the solution during the sulphuric acid addition step below about 135° F., and thereafter separating the cobalt ammonium sulphate from the solution.

12. The method of treating an ammoniacal solution containing cobalt values which comprises the steps of reducing the pH value of the solution to within the range of from about pH 8 to about pH 7.1, adding sulphuric acid to the solution to reduce the pH value to at least about pH 4 to convert the cobalt values to and precipitate them as cobalt ammonium sulphate, and separating the precipitated cobalt ammonium sulphate from the solution.

FRANK ARTHUR FORWARD.

References Cited in the file of this patent

UNITED STATES PATENTS

| Number | Name | Date |
| --- | --- | --- |
| 1,686,391 | Muller | Oct. 2, 1928 |
| 2,356,183 | Shepard | Aug. 22, 1944 |
| 2,520,958 | Poole | Sept. 5, 1950 |
| 2,576,314 | Forward | Nov. 27, 1951 |